(12) United States Patent
Enderich et al.

(10) Patent No.: US 8,940,071 B2
(45) Date of Patent: Jan. 27, 2015

(54) FILTER ELEMENT, IN PARTICULAR AIR FILTER ELEMENT

(75) Inventors: Andreas Enderich, Esslingen (DE); Alexander Jerger, Pforzheim (DE); Matthias Traub, Boeblingen (DE); Hendrik Von Merkatz, Remseck (DE)

(73) Assignee: Mahle International GmbH (DE)

( * ) Notice: Subject to any disclaimer, the term of this patent is extended or adjusted under 35 U.S.C. 154(b) by 146 days.

(21) Appl. No.: 13/703,191

(22) PCT Filed: Jun. 7, 2011

(86) PCT No.: PCT/EP2011/059407
§ 371 (c)(1),
(2), (4) Date: Mar. 4, 2013

(87) PCT Pub. No.: WO2011/154412
PCT Pub. Date: Dec. 15, 2011

(65) Prior Publication Data
US 2013/0152531 A1    Jun. 20, 2013

(30) Foreign Application Priority Data
Jun. 10, 2010 (DE) .......... 10 2010 023 393

(51) Int. Cl.
*B01D 46/00* (2006.01)
*B01D 46/24* (2006.01)
*B01D 46/52* (2006.01)

(52) U.S. Cl.
CPC ........ *B01D 46/0002* (2013.01); *B01D 46/2414* (2013.01); *B01D 46/521* (2013.01); *B01D 2275/206* (2013.01)
USPC .............. 55/499; 55/385.3; 55/498; 55/510; 55/529

(58) Field of Classification Search
CPC .. B01D 46/02; B01D 46/521; B01D 46/2414; B01D 2275/206
USPC .......... 55/385.3, 498–499, 510, 529
See application file for complete search history.

(56) References Cited

U.S. PATENT DOCUMENTS

| 4,204,846 A | * | 5/1980 | Brenholt ............. 96/425 |
| 4,251,374 A | * | 2/1981 | Cunningham ......... 210/232 |
| 4,640,698 A | | 2/1987 | Ohishi et al. |
| 8,157,883 B2 | * | 4/2012 | Felber et al. ............ 55/510 |

(Continued)

FOREIGN PATENT DOCUMENTS

| DE | 2819177 A1 | 11/1978 |
| DE | 3518076 A1 | 11/1985 |
| DE | 202005003046 U1 | 7/2006 |
| DE | 202006016102 U1 | 2/2008 |
| DE | 102007024287 A1 | 11/2008 |
| DE | 102008028834 A1 | 12/2009 |

(Continued)

OTHER PUBLICATIONS

English abstract provided for DE202005003046.

*Primary Examiner* — Jason M Greene
*Assistant Examiner* — Karla Hawkins
(74) *Attorney, Agent, or Firm* — Rader, Fishman & Grauer PLLC

(57) ABSTRACT

A filter element may include a first end disc, a second end disc, a filter medium arranged between the first and second end discs, wherein the first and second end discs are spaced by a filter medium. A third end disc may connect the first and second end discs and be arranged obliquely to at least one of the first end disc and the second end disc. The third end disc may include at least one of an inlet and outlet.

20 Claims, 1 Drawing Sheet

(56) References Cited

U.S. PATENT DOCUMENTS

2010/0051537 A1 3/2010 Amesoeder et al.
2010/0154369 A1 6/2010 Berisha et al.

FOREIGN PATENT DOCUMENTS

GB 1588578 A 4/1981
JP 57-018451 U 1/1982

* cited by examiner

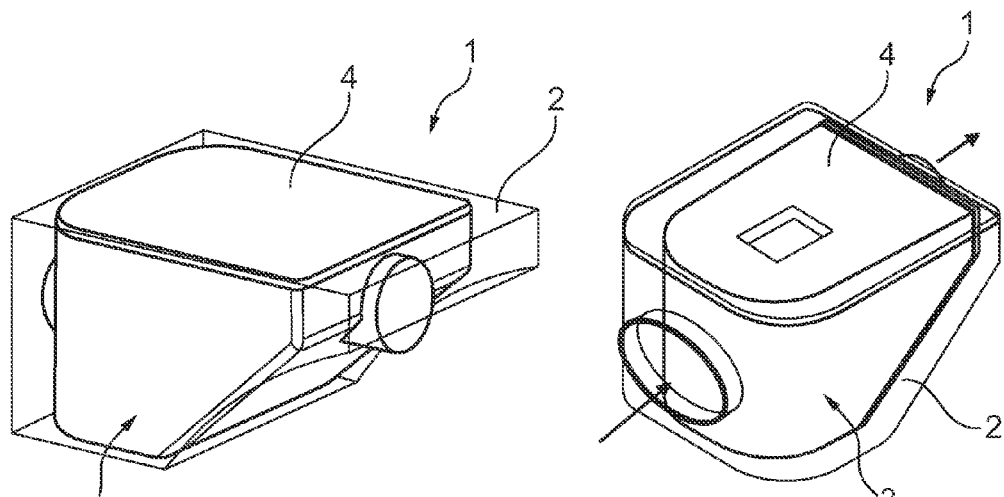
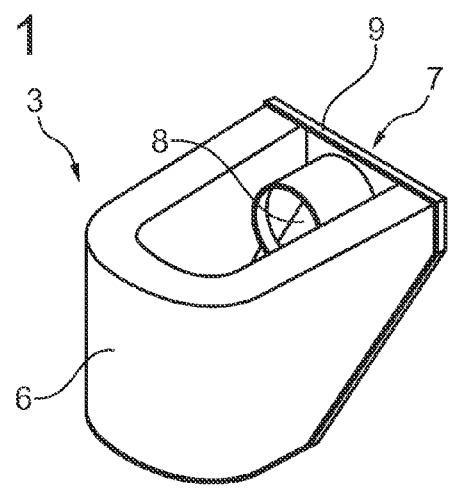
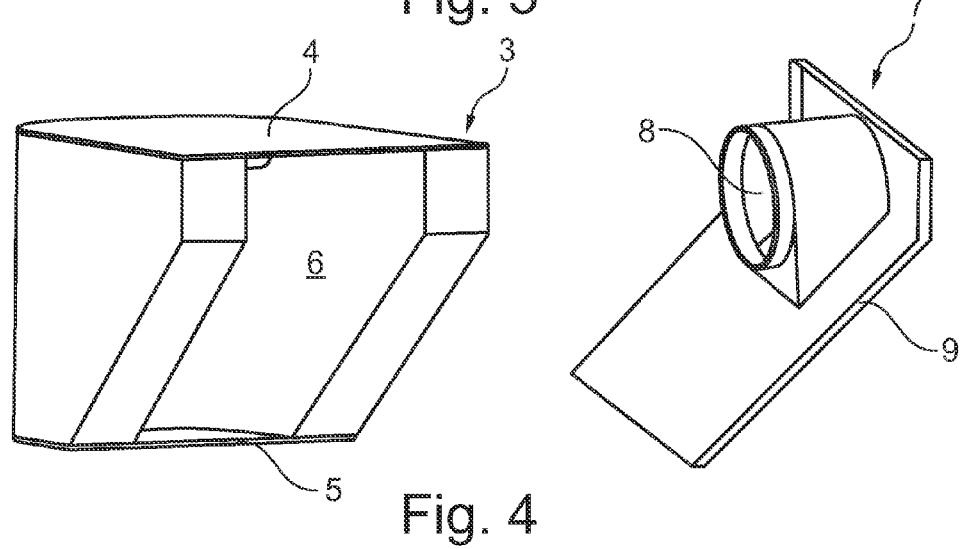

FILTER ELEMENT, IN PARTICULAR AIR FILTER ELEMENT

CROSS-REFERENCE TO RELATED APPLICATIONS

This application claims priority to German Patent Application 10 2010 023 393.5, filed on Jun. 10, 2010, and International Patent Application PCT/EP2011/059407, filed on Jun. 7, 2011, both of which are hereby incorporated by reference in their entirety.

TECHNICAL FIELD

The present invention relates to a filter element, in particular an air filter element, comprising a first and a second end disc as well as a filter medium according to the preamble of Claim 1. The invention additionally relates to an air filter having such an air filter element.

BACKGROUND

From DE 10 2008 028 834 A1 a generic filter element is known, comprising two end discs and a filter medium arranged in between. The two end discs in this case are orientated inclined to each other or at least comprise surfaces that are inclined to each other, wherein the known filter element is designed annularly closed. Through inclined arrangement of the two end discs to each other it is possible to utilise construction spaces which have not been usable hitherto.

Filter elements, in particular air filter elements, are a popular and indispensible part of modern motor vehicle engines and employed in almost all motor vehicles. There, the object of the filter elements is to clean and particularly free of suspended matter the intake air provided for the combustion, which under certain conditions could create damages during the combustion in the combustion engine. Considering modern engine compartments however it is evident that these have ever less free construction space and that even construction spaces that have not been accessed in the past, for example such as are very rugged, are exploited for function components.

SUMMARY

The present invention deals with the problem of stating an improved embodiment for a filter element of the generic type, which is characterized in particular by a high flexibility with respect to its use.

According to the invention, this problem is solved through the subjects of the independent claims. Advantageous embodiments are subject of the dependent claims.

The present invention is based on the general idea of avoiding a third end disc with a usually known filter element having two end discs and a filter medium arranged in between, which connects the two other end discs with each other and which is arranged obliquely to the first and/or second end disc and additionally comprises an inlet and/or outlet. A filter element designed in such a manner makes possible an almost freely selectable shape, for example a wedge shape, as a result of which it is made possible to make accessible and utilise construction spaces that have not been accessible for such filter elements hitherto. Through the inlet and/or outlet provided on the third end disc a housing of an air filter surrounding the filter element according to the invention can be additionally designed so that its supply and disposal can likewise be routed through the construction spaces which were not accessible or usable since for example very rugged, in the past. The inlet and/or outlet can for example be co-moulded onto the third end disc in the form of an inlet or outlet connector protruding to the inside and because of this be produced cost-effectively. In general, the third end disc makes it possible to adapt the filter element according to the invention and thus also an air filter according to the invention to suitable construction spaces so that these can be accommodated in an engine compartment in a construction space-optimising manner, so that the construction space hitherto reserved for such air filters becomes free and in particular can be otherwise utilised. Just like the two other end discs, the third end disc in this case can also be produced as cost-effective plastic injection moulding.

With an advantageous further development of the solution according to the invention, at least one margin of the third end disc engages about the filter medium and because of this forms a natural barrier for an adhesive that is to tightly connect the third end disc with the filter medium. Such a margin engaging about the filter medium can obviously be arranged also on the two other end discs, wherein it not only forms a natural barrier for adhesive and because of this prevents an unintentional and undesirable contamination of the filter medium with adhesive, but at the same time also represents a contact profile which facilitates the assembly, in particular the gluing of the third end disc to the filter medium. Such a margin can be easily produced in the same operation, i.e. together with the third end disc, for example easily moulded-on. Obviously, instead of the adhesive, another connecting method between the third end disc and the filter medium can also be provided, for example the filter medium can be inserted into the plasticised third end disc or foamed in. It is merely important here that an undesired bypass flow, which bypasses the filter medium, can be reliably prevented.

Further important features and advantages of the invention are obtained from the subclaims, from the drawings and from the associated Figure description by means of the drawings. It is to be understood that the features mentioned above and still to be explained in the following cannot only be used in the respect combination stated but also in other combinations or by themselves without leaving the scope of the present invention.

Preferred exemplary embodiments of the invention are shown in the drawings and are explained in more detail in the following description, wherein same reference characters relate to same or similar or functionally same components. There it shows, in each case schematically,

BRIEF DESCRIPTION OF THE DRAWINGS

FIG. 1 a partially transparent representation of an air filter according to the invention with a filter element located inside, FIG. 2 a representation as in FIG. 1, however from another perspective, FIG. 3 a view of the filter element according to the invention, however with first (upper) and second (lower) end disc, FIG. 4 an exploded representation of the filter element according to the invention with first and second end disc as well as removed third end disc.

DETAILED DESCRIPTION

According to FIGS. 1 and 2, an air filter 1 according to the invention comprises a filter housing 2 with a filter element 3 according to the invention arranged therein. As is evident in this case from all FIGS. 1 to 4, the filter element 3 according to the invention and through this, also the filter housing 2 of the air filter 1 surrounding said filter element comprises an unusual, here a wedge-like shape wherein a first end disc 4, i.e. an upper end disc is designed larger than a second end disc 5, i.e. a lower end disc (see FIG. 4). Between the two end discs 4 and 5 substantially running parallel to each other, a filter medium 6, for example a pleated star of filter paper is arranged, through which the fluid to be cleaned, for example the air to be cleaned, has to flow during the operation of the air filter 1. The end discs 4, 5 are arranged at least in regions at a right angle to the filter medium 6 or its pleat back. According to the invention, a third end disc 7 connecting the two end discs 4 and 5 is now provided, which at least in regions is arranged obliquely to the first and/or to the second end disc 4, 5 and which at the same time comprises an inlet and/or outlet 8.

The filter medium 6 and thus the filter element 3 is designed open on a side, in particular horseshoe-shaped, wherein this open side is closed off through the third end disc 7. The inlet and/or outlet 8 is for example formed by an inlet and/or outlet connector directly moulded onto the third end disc 7, as this is clearly evident from the right representation of FIG. 4. In order to be able to reliably prevent a bypass flow that is undesirable, i.e. bypassing the filter medium 6, the three end discs 4, 5 and 7 are connected to the filter medium 6 in an air-tight manner, in particular glued, foamed in or inserted in the respective end disc 4, 5, 7 in a plasticising manner.

As is evident from FIGS. 3 and 4, the third end disc 7 has two planes which are arranged angled-off from each other, wherein the first and the second end disc 4, 5 are designed flat and are additionally arranged parallel to each other. Alternatively to this, one of the end discs 4 or 5 can obviously also have two planes arranged angled-off from each other, while the other end disc 5 or 4 and the third end disc 5, 7 are designed flat.

At least one margin 9 of the third end disc 7 in this case is designed engaging about the filter medium 6 and because of this forms a natural barrier for adhesive at the same time, with which the third end disc 7 is to be glued to the filter medium 6. Such a margin can be additionally utilised as assembly 8, since it forms a haptic stop.

Generally, the filter element 3 according to the invention has an on-annularly closed but rather open, i.e. for example horseshoe-shaped or C-shaped form, wherein this open side is closed off via the third end disc 7. According to the invention, an inlet and/or outlet 8 is arranged in the third end disc 7, wherein the third end disc 7 for example is tightly connected to pleat surfaces or pleats backs of the filter medium. In the obliquely running region of the filter medium 6, the third end disc 7 is connected to the filter medium 6 on the face end. Here, the third end disc 7 comprises two surfaces or regions that run at an angle to each other. All end discs 4, 5, 7 are not only tightly connected to the filter medium 6, but at the same time also tightly connected to the respective adjacent end disc 7, 5, 4.

In general, further versions are also conceivable:
the third end disc 7 is designed completely obliquely, i.e. flat,
the first and/or the second end disc 4, 5 is provided with oblique combined with a flat third end disc 7,
the first and/or the second end disc 4, 5 comprises a housing guide, for example a groove or a web,
the shape of the filter element 3 is horseshoe-shaped, C-shaped or almost ring-shaped.

In general, construction spaces which have not been accessible since for example very rugged can be accessed with the filter element 3 according to the invention and with the air filter 1 according to the invention, as a result of which a tense construction space situation that is present in modern engine compartments anyhow can be relaxed. The embodiments of the filter element 3 and of the air filter 1 that are shown in this case merely serve to show a possible example so that the shape that is finally selected for the air filter 1 and the filter element 3 can be individually adapted to specific construction spaces.

The invention claimed is:

1. A filter element, comprising:
   a first end disc, a second end disc and a filter medium arranged between the first and second end discs, wherein the first and second end discs are spaced by a filter medium,
   a third end disc connecting the first and second end discs and arranged obliquely to at least one of the first end disc and the second end disc and including at least one of an inlet and outlet,
   wherein the filter element has a wedge-shaped form, and further wherein the first end disc is larger than the second end disc.

2. The filter element according to claim 1, wherein the filter medium is open on a side and the open side is closed off by the third end disc.

3. The filter element according to claim 1, wherein the third end disc includes at least one of a moulded-on inlet and outlet socket directed to the inside.

4. The filter element according to claim 1, wherein at least one of the first and second and third end discs is connected to the filter medium by being at least one of glued, inserted in a plasticising manner and foamed in.

5. The filter element according to claim 1, wherein the third end disc includes two planes arranged angled from each other, and further wherein the first and the second end disc are flat.

6. The filter element according to claim 1,
   wherein the first end disc includes two planes arranged angled from each other and the second and the third end discs are flat.

7. The filter element according to claim 1, wherein the third disc includes at least one margin configured to engage the filter medium and form a natural barrier for adhesive.

8. The filter element according to claim 1, wherein the first and the second end discs are arranged parallel to each other.

9. The filter element according to claim 1, wherein the filter medium includes an obliquely running region on which the third end disc is connected to the filter medium at a face end.

10. An air filter, comprising: a filter element and a filter housing configured to receive the filter element,
    a first end disc,
    a second end disc,
    a filter medium arranged between the first and second end discs, wherein the first and second end discs are spaced by a filter medium,
    a third end disc connecting the first and second end discs and arranged obliquely to at least one of the first end disc and the second end disc and including at least one of an inlet and outlet,
    wherein the filter element has a wedge-shaped form, and further wherein the first end disc is larger than the second end disc.

11. The air filter according to claim 1, wherein the filter medium is open on a side and the open side is closed off by the third end disc.

12. The air filter according to claim 1, wherein the third end disc includes at least one of a moulded-on inlet and outlet socket directed to the inside.

13. The air filter according to claim 1, wherein at least one of the first and second and third end discs is connected to the filter medium by being at least one of glued, inserted in a plasticising manner, and foamed in.

14. The air filter according to claim 1, wherein the third end disc includes two planes arranged angled from each other, and further wherein the first and the second end disc are flat.

15. The air filter according to claim 1, wherein the first end disc includes two planes arranged angled from each other and the second and the third end discs are flat.

16. The air filter according to claim 1, wherein the third disc includes at least one margin configured to engage the filter medium and form a natural barrier for adhesive.

17. The air filter according to claim 1, wherein the first and the second end discs are arranged parallel to each other.

18. The air filter according to claim 1, wherein the filter medium includes an obliquely running region on which the third end disc is connected to the filter medium at a face end.

19. The filter element according to claim 2, wherein the filter medium is configured as at least one of a horseshoe shape and C-shape.

20. The filter element according to claim 1, wherein the second end disc includes two planes arranged angled from each other and the first and the third end discs are designed flat.

\* \* \* \* \*